(12) United States Patent
Yang

(10) Patent No.: US 11,414,068 B2
(45) Date of Patent: Aug. 16, 2022

(54) APPARATUS AND METHOD FOR CONTROLLING AUTONOMOUS DRIVING

(71) Applicant: HYUNDAI MOBIS CO., LTD., Seoul (KR)

(72) Inventor: Hea Jin Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 152 days.

(21) Appl. No.: 16/447,698

(22) Filed: Jun. 20, 2019

(65) Prior Publication Data

US 2019/0389454 A1 Dec. 26, 2019

(30) Foreign Application Priority Data

Jun. 20, 2018 (KR) .......................... 10-2018-0070751

(51) Int. Cl.
*B60W 30/02* (2012.01)
*B60W 10/20* (2006.01)
(Continued)

(52) U.S. Cl.
CPC .......... *B60W 30/025* (2013.01); *B60W 10/04* (2013.01); *B60W 10/18* (2013.01);
(Continued)

(58) Field of Classification Search
CPC .... B60W 30/025; B60W 10/20; B60W 10/18; B60W 10/04; B60W 40/08;
(Continued)

(56) References Cited

U.S. PATENT DOCUMENTS

| 9,646,428 | B1 * | 5/2017 | Konrardy | ............... | B60W 30/16 |
| 10,824,145 | B1 * | 11/2020 | Konrardy | ............... | B60R 25/10 |

FOREIGN PATENT DOCUMENTS

| CN | 106132806 | | 11/2016 | | |
| CN | 107054323 | A * | 8/2017 | ......... | B60R 16/0231 |

(Continued)

OTHER PUBLICATIONS

Office Action of corresponding Korean Patent Application No. 10-2018-0070751—5 pages (dated Aug. 1, 2019).
(Continued)

*Primary Examiner* — Nga X Nguyen
(74) *Attorney, Agent, or Firm* — DLA Piper LLP (US)

(57) ABSTRACT

An apparatus for controlling autonomous driving may include: a travel detection unit configured to detect travel environment and travel conditions of a host vehicle that is in an autonomous driving state; an autonomous-driving control unit configured to control the autonomous driving of the host vehicle based on the travel environment and the travel conditions detected by the travel detection unit, and predict physical abnormalities occurring in a passenger of the host vehicle due to the autonomous driving of the host vehicle; and an interface control unit configured to generate vehicle operation contents of the host vehicle for alleviating the predicted physical abnormalities, when the passenger's (Continued)

physical abnormalities are predicted by the autonomous-driving control unit, and then to provide the generated vehicle operation contents for the passenger.

15 Claims, 8 Drawing Sheets

(51) Int. Cl.
*B60W 10/18* (2012.01)
*B60W 10/04* (2006.01)
*B60W 40/08* (2012.01)
*G05D 1/00* (2006.01)

(52) U.S. Cl.
CPC ............ *B60W 10/20* (2013.01); *B60W 40/08* (2013.01); *G05D 1/0088* (2013.01); *B60W 2400/00* (2013.01); *B60W 2710/18* (2013.01); *B60W 2710/20* (2013.01); *B60W 2720/106* (2013.01); *G05D 2201/0212* (2013.01); *G05D 2201/0213* (2013.01)

(58) Field of Classification Search
CPC ......... B60W 2400/00; B60W 2710/18; B60W 2710/20; B60W 2720/106; B60W 2540/00; B60W 2540/26; B60W 2540/229; B60W 2540/223; B60W 2540/221; B60W 2540/22; B60W 60/0013; B60W 60/00; B60W 50/0097; B60W 50/14; B60W 2050/146; B60W 30/14; B60W 40/02; B60W 2040/0818; G05D 1/0088; G05D 2201/0212; G05D 2201/0213; G05D 1/0061

See application file for complete search history.

(56) References Cited

FOREIGN PATENT DOCUMENTS

| | | | | |
|---|---|---|---|---|
| CN | 107215296 | | 9/2017 | |
| CN | 107817714 | | 3/2018 | |
| EP | 3330825 | | 6/2018 | |
| JP | 11-288498 | A | 10/1999 | |
| JP | 2007-141223 | A | 6/2007 | |
| JP | 2007141223 | A * | 6/2007 | |
| JP | 2016-133984 | | 7/2015 | |
| JP | 2017-71369 | A | 4/2017 | |
| JP | 2017071369 | A * | 4/2017 | |
| KR | 10-2018-0033139 | A | 4/2018 | |
| WO | WO-2009148188 | A1 * | 12/2009 | ............. G07C 5/085 |

OTHER PUBLICATIONS

Chinese Office Action dated Apr. 2, 2022 issued in Chinese Application No. 201910511853.4.

* cited by examiner

APPARATUS AND METHOD FOR CONTROLLING AUTONOMOUS DRIVING

CROSS-REFERENCES TO RELATED APPLICATIONS

The present application claims priority to Korean application number 10-2018-0070751, filed on Jun. 20, 2018 which is incorporated by reference in its entirety.

BACKGROUND OF THE INVENTION

The present invention relates to an apparatus and method for controlling autonomous driving, and more particularly, to an apparatus and method for controlling autonomous driving for alleviating physical abnormalities that may occur in a passenger in an autonomous driving process.

Recently, automotive industry is advancing to realize autonomous driving that minimizes a driver's intervention when driving a vehicle. An autonomous vehicle means a vehicle that itself determines a travel route by recognizing the surrounding environment through the function of sensing and processing outside information upon driving, and is independently driven using its own power.

The autonomous vehicle may prevent a collision with an obstacle on the travel route even if a driver does not operate a steering wheel, an acceleration pedal, a brake and the like, and may itself travel to a destination while adjusting the vehicle speed and the travel direction depending on the shape of the road. For example, the autonomous vehicle may be accelerated in the case of a straight road, and may be decelerated while changing a travel direction to correspond to the curvature of the road in the case of a curved road.

The development of autonomous driving technology facilitates a 'Hands Free' operation and an 'Eye Free' operation in a driving process, thus allowing the autonomous vehicle (i.e., autonomous driving control system) itself to perform a control operation such as the longitudinal and transverse control of the vehicle and the obstacle avoidance. Consequently, it is unnecessary for the driver to keep eyes forward or recognize external traffic conditions, so that the driver can perform a non-driving action irrelevant to the driving, for example, infotainment or reading, in the vehicle.

Meanwhile, the autonomous vehicle is advantageous in that it is unnecessary for the driver to directly intervene in driving, thus decreasing a driver's workload and allowing the driver to perform the non-driving action. However, since the driver simply acts as the passive passenger, he or she may more frequently experience physical abnormalities (or symptoms) such as motion sickness.

The motion sickness that may be typical physical abnormalities occurring in the driver of the autonomous vehicle is caused by cognitive dissonance between a sight and the inner ear that is a static organ. If the driver drives the vehicle directly, he or she predicts a travel trajectory while accurately observing road conditions, and directly operates a steering wheel for changing a direction, a brake for adjusting a speed, and acceleration, so that it is possible to predict the behavior of the vehicle. Thus, the dissonance is minimized and the possibility of the motion sickness becomes significantly lower as compared to the passive passenger. On the other hand, as for the autonomous driving, the vehicle (system) performs the vehicle operation, so that it is difficult for the driver to predict the vehicle behavior and it is difficult to know a future trajectory for the autonomous driving unless the passenger keeps eyes forward. Further, if the passenger performs the non-driving action such as reading or video watching instead of keeping eyes forward, the cognitive dissonance may be increased and thus it is more likely to cause the motion sickness.

That is, the autonomous vehicle is advantageous in that it is conveniently unnecessary for the driver to drive the vehicle directly, but is disadvantageous in that the driver feels discomfort due to an increase in physical abnormalities such as motion sickness caused by the cognitive dissonance. These problems hinder the growth of the autonomous vehicle market.

SUMMARY OF THE INVENTION

Embodiments of the present invention are directed to an apparatus and method for controlling autonomous driving, which overcome limitation on predicting the future trajectory and behavior of a vehicle as a driver simply acts as a passive passenger because of the properties of an autonomous vehicle, thus alleviating physical abnormalities (or symptoms) such as motion sickness caused by the driver's cognitive dissonance.

In one embodiment, an apparatus for controlling autonomous driving may include a travel detection unit configured to detect travel environment and travel conditions of a host vehicle that is in an autonomous driving state; an autonomous-driving control unit configured to control the autonomous driving of the host vehicle based on the travel environment and the travel conditions detected by the travel detection unit, and predict physical abnormalities occurring in a passenger of the host vehicle due to the autonomous driving of the host vehicle; and an interface control unit configured to generate vehicle operation contents of the host vehicle for alleviating the predicted physical abnormalities, when the passenger's physical abnormalities are predicted by the autonomous-driving control unit, and then to provide the generated vehicle operation contents for the passenger.

The autonomous-driving control unit may predict the physical abnormalities occurring in the passenger based on a change in acceleration of the host vehicle, caused by one or more of a steering operation, a braking operation and an accelerating operation in an autonomous driving process of the host vehicle.

The interface control unit may receive information about one or more of the steering operation, the braking operation and the accelerating operation from the autonomous-driving control unit, and then may generate the vehicle operation contents reflecting one or more of an operation target, an operation amount, and operation timing based on the received information.

The apparatus may further include a passenger detection unit configured to detect a state of the passenger, and the interface control unit may display the vehicle operation contents at a location corresponding to a passenger's gazing direction determined based on the passenger's state detected by the passenger detection unit.

The interface control unit may display both the vehicle operation contents and an autonomous travel trajectory of the host vehicle at the location corresponding to the passenger's gazing direction.

When it may be determined that the passenger's state detected by the passenger detection unit is a state where it is impossible to visually recognize the vehicle operation contents, the interface control unit may give the passenger option information that causes the passenger to select a method of providing the vehicle operation contents.

The interface control unit may acoustically provide the vehicle operation contents for the passenger or may provide no vehicle operation contents for the passenger, according to the passenger's selection.

In another embodiment, a method for controlling autonomous driving may include detecting, by a travel detection unit, travel environment and travel conditions of a host vehicle that is in an autonomous driving state; controlling autonomous driving of the host vehicle based on the travel environment and the travel conditions detected by the travel detection unit, and predicting physical abnormalities occurring in a passenger of the host vehicle due to the autonomous driving of the host vehicle, by an autonomous-driving control unit; generating, by an interface control unit, vehicle operation contents of the host vehicle for alleviating the predicted physical abnormalities when the physical abnormalities of the passenger are predicted by the autonomous-driving control unit; and providing, by the interface control unit, the generated vehicle operation contents for the passenger.

In the predicting, the autonomous-driving control unit may predict the physical abnormalities occurring in the passenger based on a change in acceleration of the host vehicle, caused by one or more of a steering operation, a braking operation and an accelerating operation in an autonomous driving process of the host vehicle.

In the generating, the interface control unit may receive information about one or more of the steering operation, the braking operation and the accelerating operation from the autonomous-driving control unit, and then may generate the vehicle operation contents reflecting one or more of an operation target, an operation amount, and operation timing based on the received information.

The method may further include detecting, by a passenger detection unit, a state of the passenger, and at the providing, the interface control unit may display the vehicle operation contents at a location corresponding to a passenger's gazing direction determined based on the passenger's state detected by the passenger detection unit.

In the providing, the interface control unit may display both the vehicle operation contents and an autonomous travel trajectory of the host vehicle at the location corresponding to the passenger's gazing direction.

In the providing, when it may be determined that the passenger's state detected by the passenger detection unit is a state where it is impossible to visually recognize the vehicle operation contents, the interface control unit may give the passenger option information that causes the passenger to select a method of providing the vehicle operation contents.

In the providing, the interface control unit may acoustically provide the vehicle operation contents for the passenger or may provide no vehicle operation contents for the passenger, according to the passenger's selection.

In an aspect of the present invention, it is possible to provide the operation information of the autonomous vehicle for a driver in consideration of a time when his or her physical abnormalities are predicted, thus alleviating physical abnormalities such as motion sickness caused by his or her cognitive dissonance.

DESCRIPTION OF SPECIFIC EMBODIMENTS

Hereafter, an apparatus and method for controlling autonomous driving in accordance with embodiments of the invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
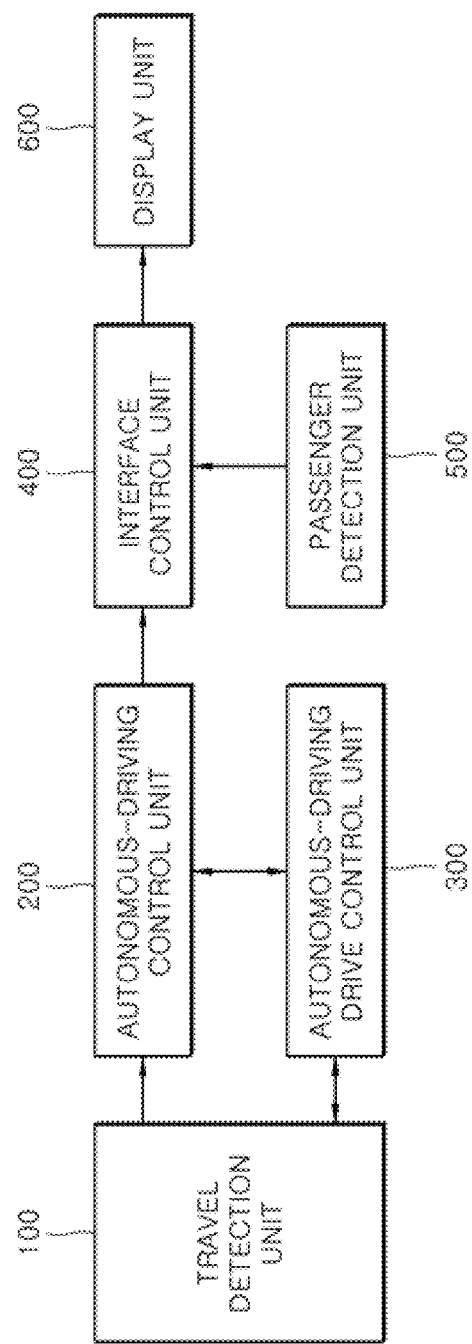
FIG. 1 is a block diagram illustrating an apparatus for controlling autonomous driving in accordance with an embodiment of the present invention.
Figure 2:
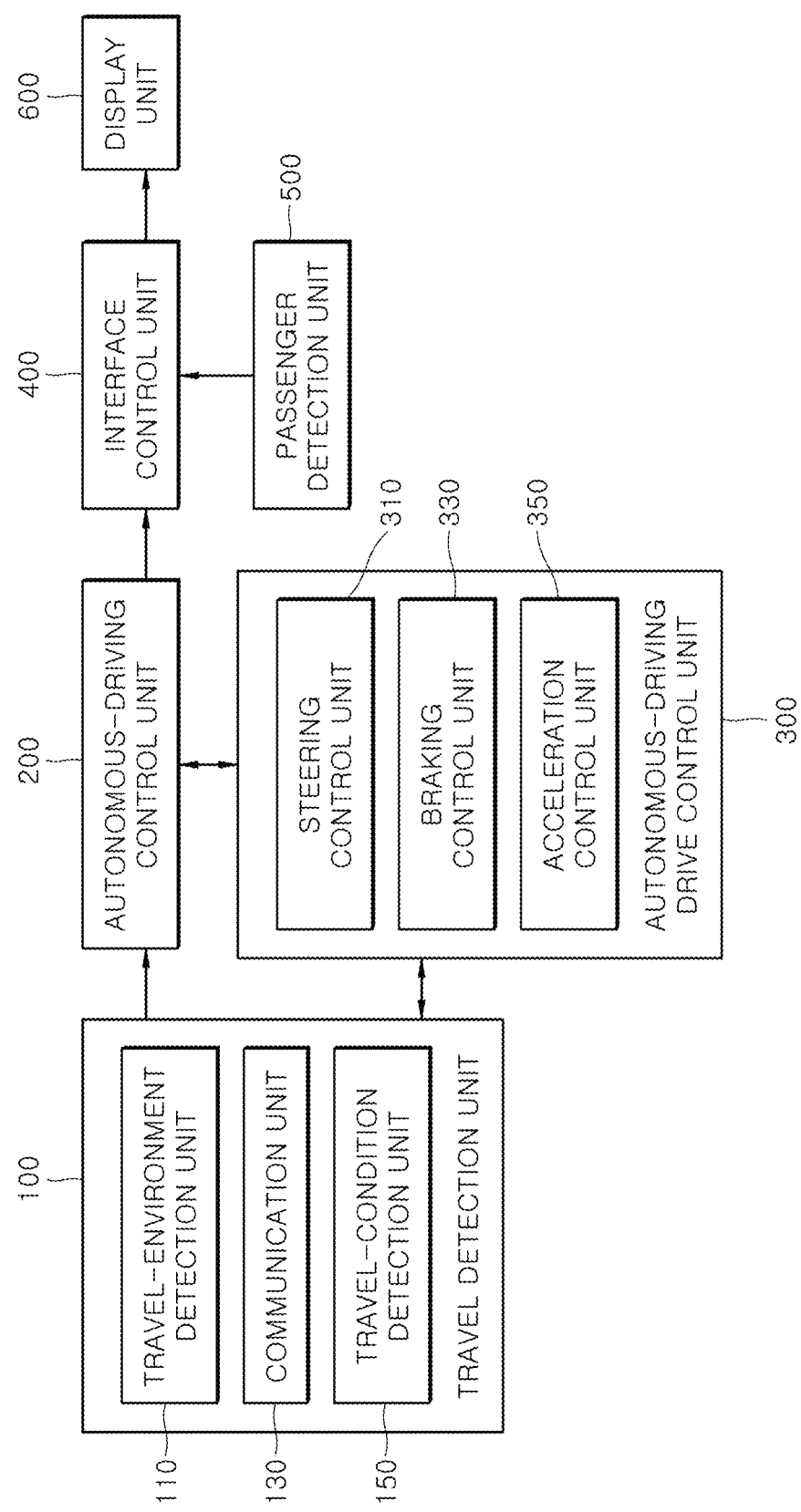
FIG. 2 is a block diagram illustrating the detailed configuration of the autonomous-driving control apparatus in accordance with the embodiment of the present invention.
Figure 3:
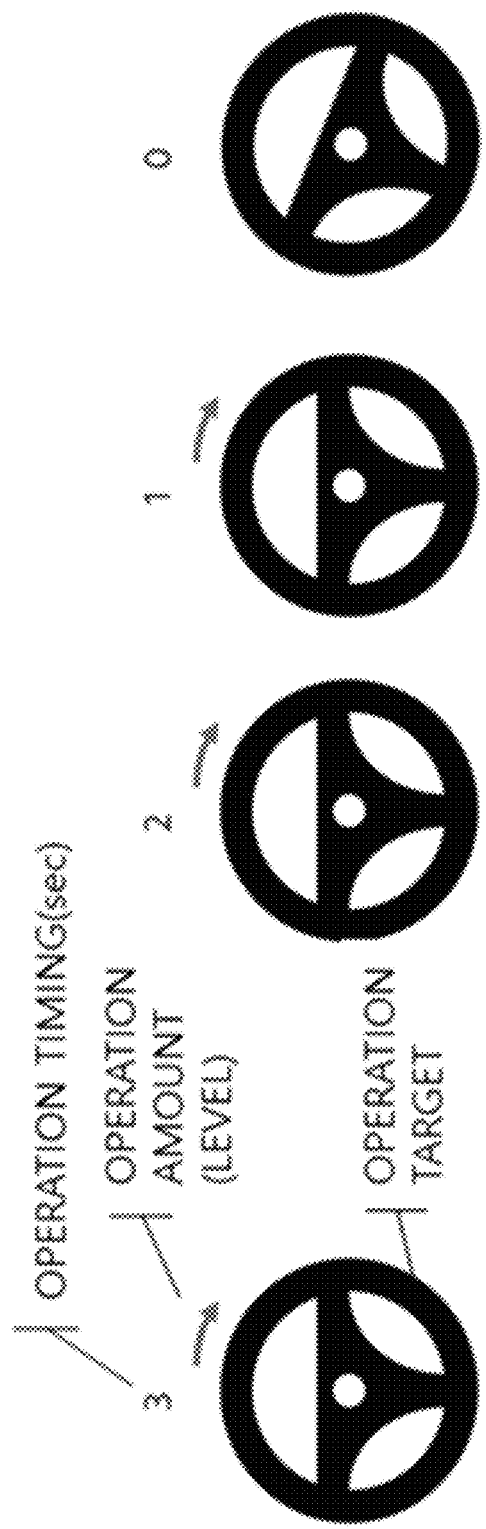
FIGS. 3 to 5 are views illustrating vehicle operation contents in the autonomous-driving control apparatus in accordance with the embodiment of the present invention.
Figure 4:
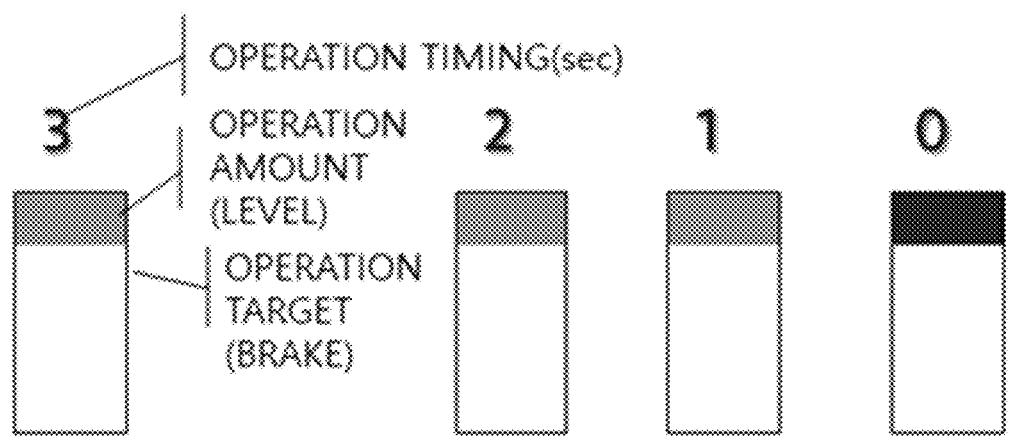
Figure 5:
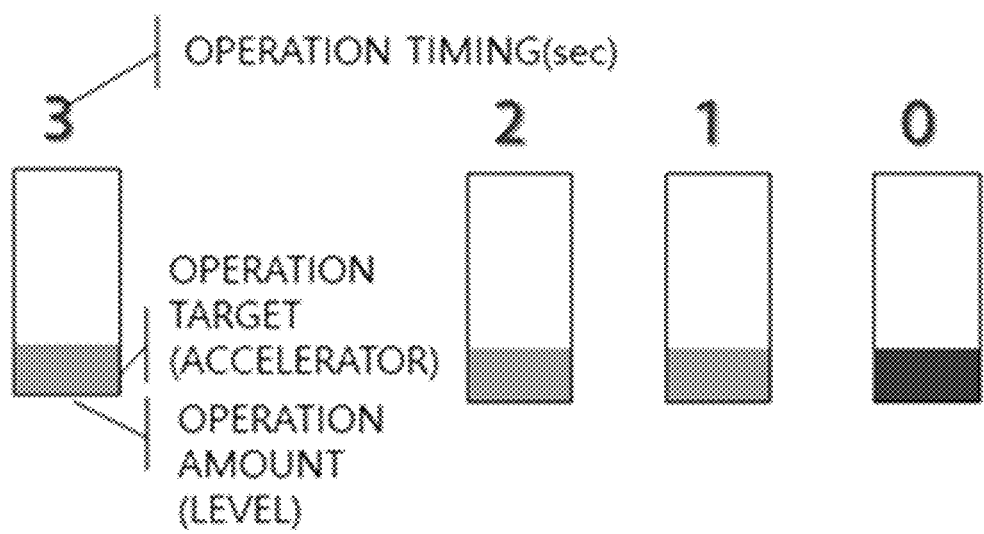
Figure 6:
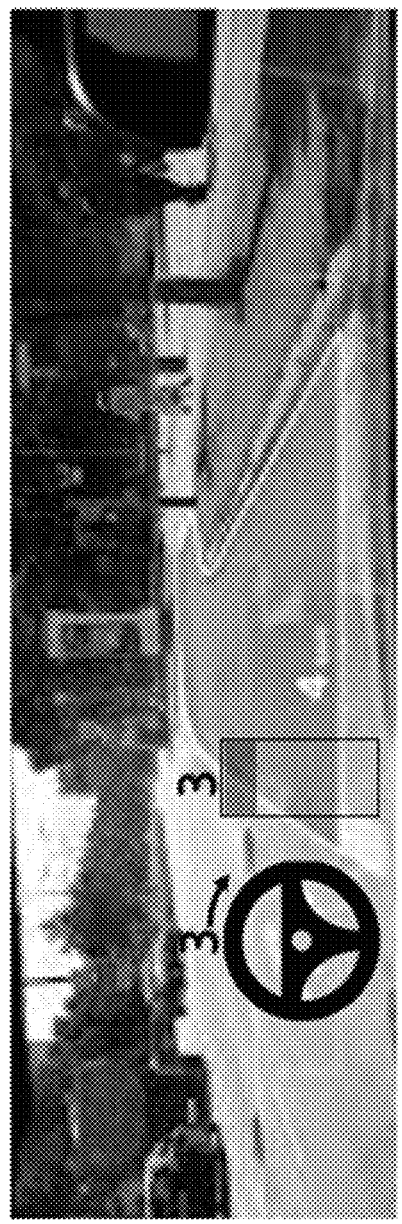
FIG. 6 is a view illustrating vehicle operation contents and autonomous travel trajectory displayed for a driver in the autonomous-driving control apparatus in accordance with the embodiment of the present invention.

FIG. 1 is a block diagram illustrating an apparatus for controlling autonomous driving in accordance with an embodiment of the present invention, FIG. 2 is a block diagram illustrating the detailed configuration of the autonomous-driving control apparatus in accordance with the embodiment of the present invention, FIGS. 3 to 5 are views illustrating vehicle operation contents in the autonomous-driving control apparatus in accordance with the embodiment of the present invention, and FIG. 6 is a view illustrating vehicle operation contents and autonomous travel trajectory displayed for a driver in the autonomous-driving control apparatus in accordance with the embodiment of the present invention.

Referring to FIG. 1, the autonomous-driving control apparatus in accordance with the embodiment of the present invention may include a travel detection unit 100, an autonomous-driving control unit 200, an autonomous-driving drive control unit 300, an interface control unit 400, a passenger detection unit 500, and a display unit 600.

The travel detection unit 100 may detect travel environment and travel conditions of a host vehicle that is in an autonomous driving state, and then may transmit the travel environment and the travel conditions to the autonomous-driving control unit 200 that will be described later. The travel detection unit 100 may include a travel-environment detection unit 110, a communication unit 130, and a travel-condition detection unit 150 as illustrated in FIG. 2, so as to detect the travel environment and the travel conditions of the host vehicle.

The travel-environment detection unit 110 may detect the travel environment required for autonomously driving the host vehicle. In this regard, the travel environment may include a moving object travelling around the host vehicle, such as the surrounding vehicle and a pedestrian, and a fixed object such as a traffic light, a signboard and the surrounding building. The travel-environment detection unit 110 may include an object recognition sensor, such as a camera sensor, a radar sensor, an ultrasonic sensor or a lidar sensor, to detect the travel environment.

The communication unit 130 may receive location information of the host vehicle required for autonomously driving the host vehicle, travel information of the surrounding vehicle and road traffic information from an outside. To this end, the communication unit 130 may include a GPS (Global Positioning System) communication module for receiving the location information of the host vehicle, and a V2X (Vehicle to Everything) communication module for receiving the travel information of the surrounding vehicle and the road traffic information.

The travel-condition detection unit 150 may detect the travel conditions of the host vehicle required for autonomously driving the host vehicle. In this regard, the travel conditions may contain all information related to a vehicle body and travel conditions, for instance, the speed, acceleration, and yaw rate of the host vehicle. The travel-condition detection unit 150 may include a speed sensor, an acceleration sensor, a yaw-rate sensor and others to detect the travel conditions.

The autonomous-driving control unit 200 may control the autonomous driving of the host vehicle based on the travel environment and the travel conditions detected by the travel detection unit 100. That is, if a travel route to a destination is initially established, the autonomous-driving control unit 200 may control the autonomous driving of the host vehicle via the autonomous-driving drive control unit 300 that will be described later, while receiving the travel environment and the travel conditions from the travel detection unit 100 in real time. The autonomous-driving control unit 200 may be usually implemented as an ECU (Electronic Control Unit) mounted on the vehicle.

The autonomous-driving drive control unit 300 may control the steering, braking and acceleration of the host vehicle by the autonomous-driving control unit 200. The autonomous-driving drive control unit 300 may control the steering, braking and acceleration of the host vehicle, respectively, depending on a steering level, a braking level and an acceleration level determined by the autonomous-driving control unit 200 for autonomously driving the host vehicle. To this end, the autonomous-driving drive control unit 300 may include a steering control unit 310 having a steering system such as MDPS (Motor Driven Power Steering), AFS (Active Front Steering) or RWS (Rear Wheel Steering), a braking control unit 330 having a braking system such as AEB (Autonomous Emergency Braking) and ABS (Anti-lock Brake System), and an acceleration control unit 350 for controlling the acceleration by driving an internal combustion engine of the host vehicle, as illustrated in FIG. 2.

According to this embodiment, the autonomous-driving control unit 200 may predict physical abnormalities occurring in a passenger of the host vehicle caused by the autonomous driving of the host vehicle.

That is, as described above, the autonomous-driving control unit 200 may perform the autonomous driving, namely, increase or reduce the speed to maintain a constant distance from a preceding vehicle, perform driving for avoiding an accident, such as a collision with an obstacle, change a lane, and change a travel direction to enter or exit a road, based on the travel environment and the travel conditions detected by the travel detection unit 100. If the autonomous-driving control unit 200 changes the speed and the travel direction of the vehicle to control the autonomous driving, a passenger who does a non-driving action in the vehicle may experience physical abnormalities (or symptoms) such as motion sickness due to cognitive dissonance. Hence, according to this embodiment, the autonomous-driving control unit 200 adopts a configuration for predicting physical abnormalities occurring in the passenger caused by the autonomous driving of the host vehicle.

Although the physical abnormalities illustrate the motion sickness by way of example, they may cover all physical abnormalities due to the cognitive dissonance of the passenger who does the non-driving action without being limited to the motion sickness.

The autonomous-driving control unit 200 may predict the physical abnormalities occurring in the passenger, based on a change in acceleration of the host vehicle caused by one or more of a steering operation, a braking operation and an accelerating operation in the autonomous driving process of the host vehicle.

That is, when the autonomous-driving control unit 200 changes the speed and the travel direction of the vehicle through the steering operation, the braking operation and the accelerating operation to control the autonomous driving, the acceleration of the host vehicle is changed. Thus, at a time when it is determined that the acceleration of the host vehicle changes in the autonomous driving process, the autonomous-driving control unit 200 may predict that the physical abnormalities will occur in a passenger.

When the physical abnormalities of the passenger are predicted by the autonomous-driving control unit 200, the interface control unit 400 may generate the vehicle operation contents of the host vehicle to alleviate the predicted physical abnormalities, and give the generated vehicle operation contents to the passenger through the display unit 600 or an acoustic output device mounted on the vehicle.

In this regard, the interface control unit 400 may receive information about one or more of the steering operation, the braking operation and the accelerating operation from the autonomous-driving control unit 200, and then may generate vehicle operation contents reflecting one or more of an operation target (steering, braking and acceleration), an operation amount (operation level) and operation timing (time remaining until operation is performed), based on the received information.

In other words, when the autonomous-driving control unit 200 predicts the physical abnormalities occurring in the passenger based on a change in acceleration of the host vehicle, caused by one or more of the steering operation, the braking operation and the accelerating operation in the autonomous driving process of the host vehicle, one or more of information about the steering operation, information about the braking operation, and information about the accelerating operation may be transmitted to the interface control unit 400. The above-described information may contain the operation target, the operation amount and the operation timing. Thus, the interface control unit 400 may generate the vehicle operation contents reflecting one or more of the operation target, the operation amount and the operation timing, based on the information received from the autonomous-driving control unit 200. FIGS. 3 to 5 illustrate the example of the vehicle operation contents generated by the interface control unit 400 (e.g., the left side of FIG. 3 illustrates that the vehicle steering is performed to the right side after 3 seconds).

The display unit 600 may display the vehicle operation contents generated by the interface control unit 400 to allow the passenger to visually check the contents. The display unit 600 may be configured to include an AR HUD (Augmented Reality Head Up Display) that provides an augmented reality display on a windshield of the vehicle, a cluster unit or a navigation terminal mounted on the vehicle, and a telematics terminal (e.g., a smart phone, a notebook, a tablet, etc.) possessed by a user.

Thus, when the physical abnormalities of the passenger in the host vehicle are predicted, even if one or more of the steering, the braking and the acceleration of the host vehicle are controlled (changed) by the autonomous-driving drive control unit 300, the interface control unit 400 provides the vehicle operation contents for the passenger through the display unit 600 to allow the passenger to predict the behavior of the vehicle and minimize the cognitive dissonance of the passenger, thus consequently alleviating the physical abnormalities of the passenger.

This embodiment may further include a passenger detection unit 500 to detect a passenger's state as illustrated in FIG. 1. The passenger detection unit 500 may include an image recognition sensor (e.g., a camera sensor) to detect the passenger's state, for example, a direction at which the passenger looks or a sleep state.

Thus, the interface control unit 400 may display the vehicle operation contents at a location (i.e., the display unit 600 at which the passenger looks) corresponding to the passenger's gazing direction, based on the passenger's state detected by the passenger detection unit 500.

That is, the interface control unit 400 determines the passenger's gazing direction, based on the passenger's state detected by the passenger detection unit 500, and displays the vehicle operation contents on the display unit 600 at which the passenger looks (e.g., the method wherein the vehicle operation contents are displayed through the AR HUD when the passenger looks at the windshield, and the vehicle operation contents are displayed through the telematics terminal when the passenger looks at the telematics terminal possessed by the passenger), thus allowing the passenger to more effectively check the vehicle operation contents.

Further, the interface control unit 400 may display both the vehicle operation contents and the autonomous travel trajectory of the host vehicle at the location corresponding to the passenger's gazing direction, as illustrated in FIG. 6. Thus, this causes the passenger to more effectively predict the vehicle's behavior while the host vehicle autonomously travels along the autonomous travel trajectory.

Meanwhile, when it is determined that the passenger's state detected by the passenger detection unit 500 is the state where it is impossible to visually recognize the vehicle operation contents, the interface control unit 400 may give the passenger option information that causes the passenger to select the method of providing the vehicle operation contents. The method of providing the vehicle operation contents may mean the form of providing the vehicle operation contents and the presence or absence of the vehicle operation contents. To be more specific, when it is determined that the passenger's state is the state where it is impossible to visually recognize the vehicle operation contents, the interface control unit 400 may acoustically provide the vehicle operation contents for the passenger or may provide no vehicle operation contents for the passenger, according to the passenger's selection. For example, when it is determined that the passenger's state is the state where it is impossible to visually recognize the vehicle operation contents, the interface control unit 400 may provide the above-described option information for the passenger through the display unit 600 (in this case, it is possible to output sound for informing the passenger that the option information is provided). If the passenger selects the option of providing the contents in the acoustic form, the interface control unit 400 may acoustically provide the vehicle operation contents through the acoustic output device mounted on the vehicle (e.g., when the passenger is reading). If the passenger selects the option of providing no vehicle operation contents, the interface control unit 400 may not provide the vehicle operation contents for the passenger (e.g., when the passenger is sleeping).

Figure 7:
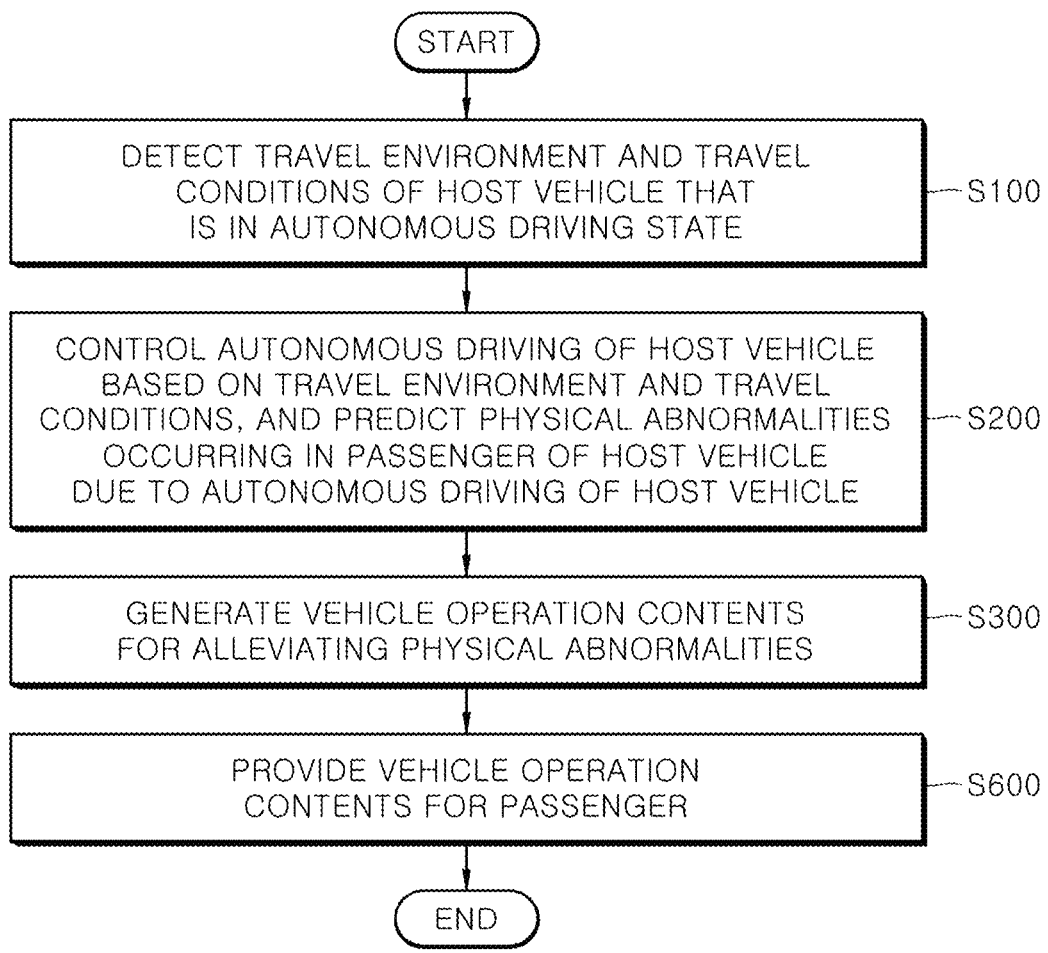
FIGS. 7 and 8 are flow charts illustrating a method for controlling autonomous driving in accordance with an embodiment of the present invention.
Figure 8:
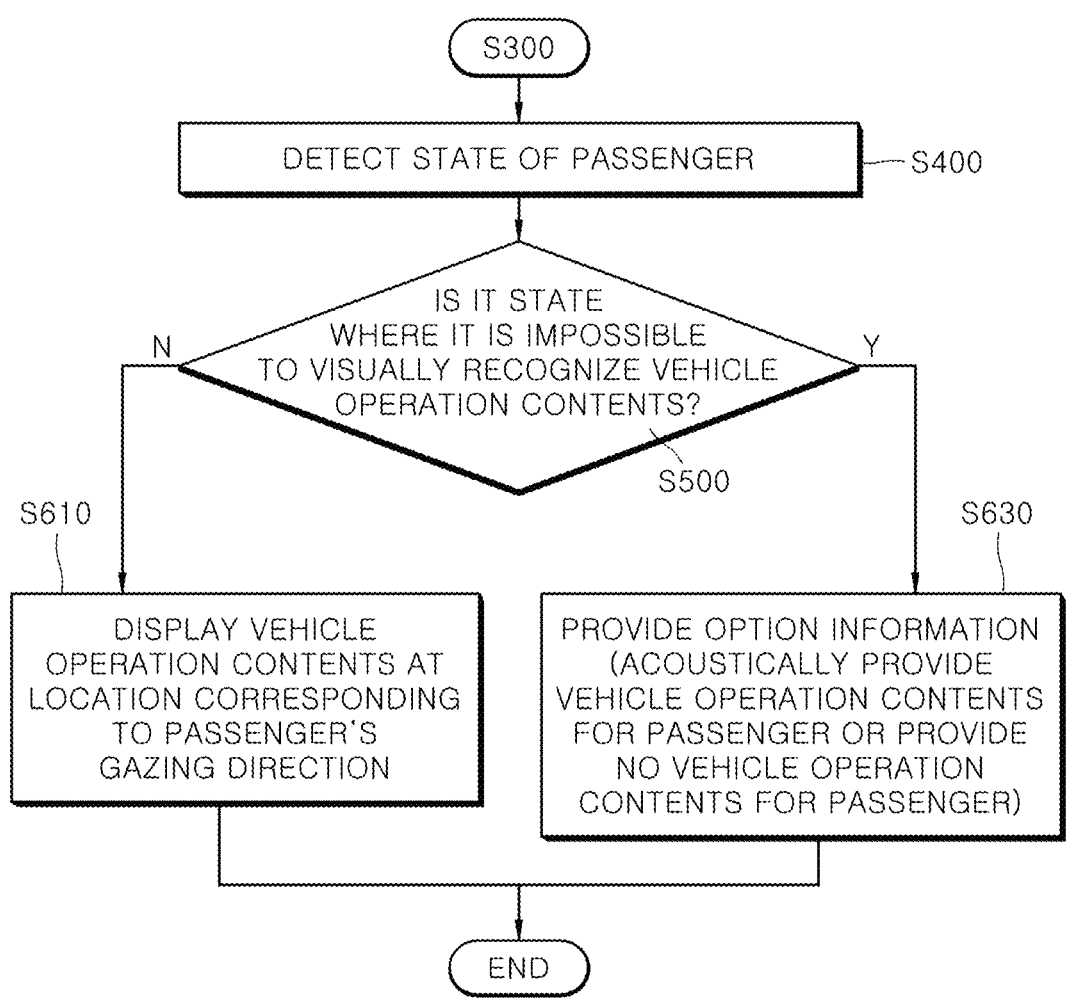

FIGS. 7 and 8 are flow charts illustrating a method for controlling autonomous driving in accordance with an embodiment of the present invention.

The method for controlling the autonomous driving in accordance with the embodiment of the present invention will be described with reference to FIG. 7. First, the travel detection unit 100 detects the travel environment and the travel conditions of the host vehicle that is autonomous driving state, at step S100.

Subsequently, the autonomous-driving control unit 200 controls the autonomous driving of the host vehicle, based on the travel environment and the travel conditions detected at step S100, and predicts the physical abnormalities occurring in the passenger of the host vehicle due to the autonomous driving of the host vehicle, at step S200.

At step S200, the autonomous-driving control unit 200 may predict the physical abnormalities occurring in the passenger based on a change in acceleration of the host vehicle, caused by one or more of the steering operation, the braking operation and the accelerating operation in the autonomous driving process of the host vehicle.

When the physical abnormalities of the passenger are predicted through step S200, the interface control unit 400 generates the vehicle operation contents of the host vehicle for alleviating the predicted physical abnormalities at step S300.

At step S300, the interface control unit 400 may receive information about one or more of the steering operation, the braking operation and the accelerating operation from the autonomous-driving control unit 200, and then may generate the vehicle operation contents reflecting one or more of the operation target, the operation amount and the operation timing, based on the received information.

Subsequently, the interface control unit 400 provides the vehicle operation contents generated at step S300 for the passenger, at step S600.

Meanwhile, as illustrated in FIG. 8, this embodiment may further include step S400 of detecting the passenger's state by the passenger detection unit 500. Thus, at step S600, the interface control unit 400 may display the vehicle operation contents at a location corresponding to the passenger's grazing direction determined based on the passenger' state detected at step S400, at step S610. Moreover, the interface control unit 400 may display both the vehicle operation contents and the autonomous travel trajectory of the host vehicle, at a location corresponding to the passenger's grazing direction.

When it is determined that the passenger's state detected at step S400 is the state where it is impossible to visually recognize the vehicle operation contents, at step S500, the interface control unit 400 may give the passenger the option information for causing the passenger to select the method of providing the vehicle operation contents, at step S600. Thus, the interface control unit 400 may acoustically give the vehicle operation contents to the passenger, or may not give the vehicle operation contents to the passenger, according to the selection of the passenger.

In accordance with the present embodiments, it is possible to provide the operation information of the autonomous vehicle for a driver in consideration of a time when his or her physical abnormalities are predicted, thus alleviating physical abnormalities such as motion sickness caused by his or her cognitive dissonance.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An apparatus for controlling autonomous driving, comprising:
a travel detection unit configured to detect travel environment and travel conditions of a host vehicle that is in an autonomous driving state;
an autonomous-driving control unit configured to control the autonomous driving of the host vehicle based on the travel environment and the travel conditions detected by the travel detection unit, and predict physical abnormalities occurring in a passenger of the host vehicle based on a change in acceleration due to the autonomous driving of the host vehicle; and
an interface control unit configured to generate vehicle operation contents of the host vehicle, the generated vehicle operation contents are provided for alleviating the physical abnormalities predicted to occur in a passenger of the host vehicle based on the change in acceleration due to the autonomous driving of the host vehicle, and then provide the generated vehicle operation contents for the passenger.

2. The apparatus of claim 1, wherein the autonomous-driving control unit predicts the physical abnormalities occurring in the passenger based on a change in acceleration of the host vehicle, caused by one or more of a steering operation, a braking operation and an accelerating operation in an autonomous driving process of the host vehicle.

3. The apparatus of claim 2, wherein the interface control unit receives information about one or more of the steering operation, the braking operation and the accelerating operation from the autonomous-driving control unit, and then generates the vehicle operation contents reflecting one or more of an operation target, an operation amount, and operation timing based on the received information.

4. The apparatus of claim 1, further comprising:
a passenger detection unit configured to detect a state of the passenger,
wherein the interface control unit displays the vehicle operation contents at a location corresponding to a passenger's gazing direction determined based on the passenger's state detected by the passenger detection unit.

5. The apparatus of claim 4, wherein the interface control unit displays both the vehicle operation contents and an autonomous travel trajectory of the host vehicle at the location corresponding to the passenger's gazing direction.

6. The apparatus of claim 4, wherein, when it is determined that the passenger's state detected by the passenger detection unit is a state where it is impossible to visually recognize the vehicle operation contents, the interface control unit gives the passenger option information that causes the passenger to select a method of providing the vehicle operation contents.

7. The apparatus of claim 6, wherein the interface control unit acoustically provides the vehicle operation contents for the passenger or provides no vehicle operation contents for the passenger, according to the passenger's selection.

8. A method for controlling autonomous driving, comprising:
detecting, by a travel detection unit, travel environment and travel conditions of a host vehicle that is in an autonomous driving state;
controlling autonomous driving of the host vehicle based on the travel environment and the travel conditions detected by the travel detection unit, and predicting physical abnormalities occurring in a passenger of the host vehicle based on a change in acceleration due to the autonomous driving of the host vehicle, by an autonomous-driving control unit;
generating, by an interface control unit, vehicle operation contents of the host vehicle, the generated vehicle operation contents are provided for alleviating the physical abnormalities predicted to occur in a passenger of the host vehicle based on the change in acceleration due to the autonomous driving of the host vehicle; and
providing, by the interface control unit, the generated vehicle operation contents for the passenger.

9. The method of claim 8, wherein at the predicting, the autonomous-driving control unit predicts the physical abnormalities occurring in the passenger based on a change in acceleration of the host vehicle, caused by one or more of a steering operation, a braking operation and an accelerating operation in an autonomous driving process of the host vehicle.

10. The method of claim 9, wherein at the generating, the interface control unit receives information about one or more of the steering operation, the braking operation and the accelerating operation from the autonomous-driving control unit, and then generates the vehicle operation contents reflecting one or more of an operation target, an operation amount, and operation timing based on the received information.

11. The method of claim 8, further comprising:
detecting, by a passenger detection unit, a state of the passenger,
wherein, in the providing, the interface control unit displays the vehicle operation contents at a location corresponding to a passenger's gazing direction determined based on the passenger's state detected by the passenger detection unit.

12. The method of claim 11, wherein, in the providing, the interface control unit displays both the vehicle operation contents and an autonomous travel trajectory of the host vehicle at the location corresponding to the passenger's gazing direction.

13. The method of claim 11, wherein, in the providing, when it is determined that the passenger's state detected by the passenger detection unit is a state where it is impossible to visually recognize the vehicle operation contents, the interface control unit gives the passenger option information that causes the passenger to select a method of providing the vehicle operation contents.

14. The method of claim 13, wherein, in the providing, the interface control unit acoustically provides the vehicle operation contents for the passenger or provides no vehicle operation contents for the passenger, according to the passenger's selection.

15. An apparatus for controlling autonomous driving, comprising:
a travel detection unit configured to detect travel environment and travel conditions of a host vehicle that is in an autonomous driving state;

an autonomous-driving control unit configured to control the autonomous driving of the host vehicle based on the travel environment and the travel conditions detected by the travel detection unit, and predict physical abnormalities occurring in a passenger of the host vehicle based on a change in acceleration due to the autonomous driving of the host vehicle; and an interface control unit configured to generate vehicle operation contents of the host vehicle, the generated vehicle operation contents are provided for alleviating the predicted physical abnormalities predicted to occur in a passenger of the host vehicle based on the change in acceleration due to the autonomous driving of the host vehicle, and then provide the generated vehicle operation contents for the passenger, wherein the interface control unit acoustically provides the vehicle operation contents for the passenger or provides no vehicle operation contents for the passenger, according to a passenger's selection.

* * * * *